United States Patent [19]

Hargraves et al.

[11] 4,194,529
[45] * Mar. 25, 1980

[54] CONTROL VALVE HAVING INTEGRAL VISUAL INDICATOR FOR FLUID SAFETY SYSTEMS

[75] Inventors: Melvin J. Hargraves, Lafayette, La.; Clifford M. Peters, Longview, Tex.

[73] Assignee: W-K-M Wellhead Systems, Inc., Shreveport, La.

[*] Notice: The portion of the term of this patent subsequent to Feb. 6, 1995, has been disclaimed.

[21] Appl. No.: 944,456

[22] Filed: Sep. 21, 1978

Related U.S. Application Data

[63] Continuation of Ser. No. 705,747, Jul. 15, 1976, Pat. No. 4,137,942.

[51] Int. Cl.² ............................................. F16K 37/00
[52] U.S. Cl. ............................. 137/557; 137/624.2 F; 116/271; 116/272
[58] Field of Search ............ 137/557, 624.2 F, 625.66; 116/266, 271, 272, 273, 276, 285, 277

[56] References Cited

U.S. PATENT DOCUMENTS

| 2,341,538 | 2/1944 | Grant, Jr. | 116/272 |
|---|---|---|---|
| 2,485,942 | 10/1949 | Turner | 116/277 |
| 2,633,098 | 3/1953 | Ellis | 116/70 |
| 2,644,939 | 7/1953 | Ebel et al. | 116/271 |
| 2,887,127 | 5/1959 | Broadbent | 137/625.29 |
| 2,896,903 | 7/1959 | Canalizo | 251/63 |
| 3,038,439 | 6/1962 | Martin et al. | 116/272 |
| 3,042,061 | 7/1962 | Dobrikin | 137/557 |
| 3,181,496 | 5/1965 | Bilbrey | 73/419 |
| 3,247,824 | 4/1966 | Rodgers | 116/271 |
| 3,333,564 | 8/1967 | Waters | 116/268 |
| 3,595,200 | 7/1971 | Cilento | 116/268 |
| 3,604,315 | 9/1971 | Rossen | 116/271 |
| 3,623,448 | 11/1971 | Resh | 116/271 |
| 3,633,612 | 1/1972 | Gross | 116/267 |
| 3,651,827 | 3/1972 | Hammer et al. | 137/557 |
| 3,672,325 | 6/1972 | Harrah | 116/268 |
| 3,720,182 | 3/1973 | Harrah | 137/557 |
| 3,742,970 | 7/1973 | Gross | 137/557 |
| 3,837,359 | 9/1974 | Nelson et al. | 137/624.27 |
| 3,877,484 | 4/1975 | Theriot et al. | 137/625.66 |
| 3,878,862 | 4/1975 | Blanton | 137/557 |
| 3,878,863 | 4/1975 | Snyder | 137/557 |
| 3,921,665 | 11/1975 | Lebzelter | 137/557 |
| 3,943,974 | 3/1976 | Connelly et al. | 137/624.27 |
| 3,992,296 | 11/1976 | Nobuta | 137/557 |
| 3,999,437 | 12/1976 | Lepine et al. | 116/272 |
| 4,020,784 | 5/1977 | Greene | 137/557 |
| 4,026,326 | 5/1977 | Wells et al. | 137/624.27 |
| 4,121,615 | 10/1978 | Bergeron | 137/557 |
| 4,137,942 | 2/1979 | Hargraves | 137/557 |

FOREIGN PATENT DOCUMENTS

1290398 3/1969 Fed. Rep. of Germany.
1964127 6/1971 Fed. Rep. of Germany.

Primary Examiner—William R. Cline
Assistant Examiner—H. Jay Spiegel
Attorney, Agent, or Firm—Eugene N. Riddle

[57] ABSTRACT

A control valve structure and combined visual indicator for controlling fluid and visually indicating the operating condition of a portion of a fluid system. The control valve has a slide valve mounted in a housing and biased toward a retracted position with one end portion thereof extending from the housing. The extended end portion of the slide valve has a knob adapted to be manually gripped for moving of the slide valve outwardly for setting same. A visual indicator is mounted on the knob. A port in the housing communicates with the slide valve to permit the application of fluid pressure to the slide valve to move same outwardly. The visual indicator has a visually observable indicator member movable between two positions for indicating the presence of either of two associated conditions in a system containing the control valve. The visual indicator displays one position when less than a predetermined fluid pressure is applied to the visual indicator and it displays the other position when a larger predetermined fluid pressure is applied to the visual indicator.

9 Claims, 9 Drawing Figures

FIG.7 TRIP

FIG.8

CONTROL VALVE HAVING INTEGRAL VISUAL INDICATOR FOR FLUID SAFETY SYSTEMS

This is a continuation of pending patent application Ser. No. 705,747, filed July 15, 1976, now U.S. Pat. No. 4,137,942.

BACKGROUND OF THE INVENTION

This invention is related to control valves of the type used in controls for fluid actuated systems wherein the control valve has a visual indicator of a condition in the system incorporated with the control device. More particularly, this invention is related to a visual indicator for a pilot valve which functions in cooperation with a pressure sensor to maintain fluid pressure to an actuator and release same wherein the visual indicator is mounted on a slide valve of the control valve.

In the prior art several slide valve style fluid actuated control valves are known which function as a pressure sensitive pilot valve or relay and perform some function in a fluid control system. These known control valves do not always provide any positive indication of whether or not operating fluid pressure is present in the system. Furthermore, because some of the prior art valves can be locked temporarily in one position they can, if not fully understood, give a false impression of the condition of a system. Two such control valves of this nature are shown in U.S. Pat. Nos. 3,943,974 and 3,823,739. In a system employing adequate and substantial safety measures it is common to include auxiliary indicators at various points in the system to indicate the presence of or the absence of adequate operating fluid pressure in the system. For a system using the above described, indicating devices must be used to provide a clear and accurate indication of conditions in the system. While a system using this style of control valves can function adequately, it has several disadvantages. One major disadvantage in this type of system is that many additional components are needed which increase the possibilities of failure in the system as well as the expense of making same. Other disadvantages of using separate indicators become apparent upon detailed examination of a specific system and considering, mounting, placement, repair, dependability and operator access to the auxiliary indicators and the control valves. In considering shortcomings of the prior art devices, it is worthwhile to note that many prior art slide type control valves are not structurally designed to be combined with an indicator in a single integral unit.

SUMMARY OF THE INVENTION

In an embodiment of the control valve and combined visual indicator comprising the present invention, the control valve has a slide valve mounted in a central bore in the housing with one end portion extending from the housing to be manually gripped for movement of the slide valve to an outward or displaced position for setting the control valve as is required in starting up a system. Ports in the housing are provided to control fluid flow in a system and to apply fluid pressure to a piston end of the slide valve to move it outwardly. The visual indicator is mounted on the outer end of the slide valve and has an easily observable contrastingly bi-colored indicator thereon. A passageway longitudinally through the slide valve communicates between the port where fluid pressure is applied to the housing to cause movement of the slide valve and the visual indicator. In operation, the visual indicator exposes one colored portion when the slide valve is in a retracted position for indicating the system is not in service, and the visual indicator exposes another second colored portion when in the extended position for indicating that the system is in operation.

One object of this invention is to provide a combination control valve and visual indicator structure overcoming the aforementioned disadvantages of the prior art devices.

Still, one other object of this invention is to provide a control valve structure which will function as a pilot in a safety and control system and simultaneously function as a visual indicator whether or not a particular portion of the system is set in operation.

Still, another object of this invention is to provide a combined control valve and visual indicator which replaces separate indicating devices which can be used in a safety system if desired.

Various other objects, advantages and features of this invention will become apparent to those skilled in the art from the following discussion, taken in conjunction with the accompanying drawings, in which:

The following is a discussion and description of preferred specific embodiments of the control valve-visual indicator structure of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Figures 1, 4, 5, 6, 9:
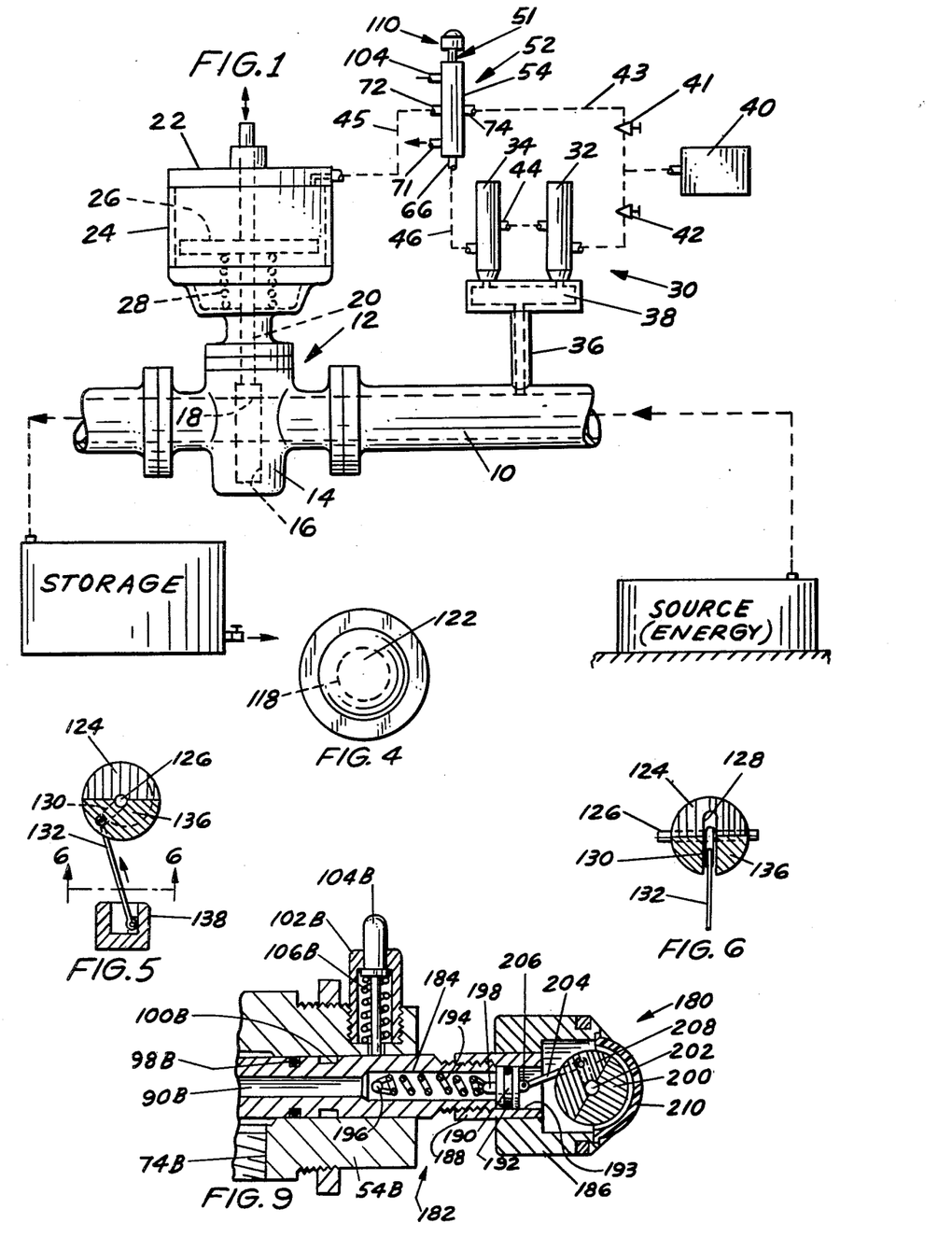
FIG. 1 is a schematic of a portion of a system utilizing the control valve-visual indicator of this invention and including an actuated valve mounted in a fluid flowline, pressure sensors connected to the flowline, the control valve-visual indicator connected to the pressure sensors, and a pneumatic supply for actuating the control valve connected to the pressure sensors and the control valve.
FIG. 4 is an operator end plan view of the observable end of the visual indicator for the embodiment of the control valve-visual indicator shown in FIGS. 2 and 3.
FIG. 5 is a view of the piston and spherical indicator member removed from the control valve-visual indicator shown in FIGS. 2-4.
FIG. 6 is a bottom view of the spherical indicator member taken on line 6—6 of FIG. 5.
FIG. 9 is a cross-sectional view of an additional embodiment of the visual indicator of this invention and a portion of a control valve with the indicator mounted on the slide valve member.

FIG. 1 shows a typical system utilizing the control valve-visual indicator of this invention. A better understanding of the invention is realized upon understanding a simple system which utilizes the control valve. The system includes a product flowline 10 with a gate valve 12 therein. Gate valve 12 has a body 14 with a gate 16 mounted therein and an opening 18 in gate 16. Gate 16 is movable between opened and closed positions relative to flowline 10. A stem 20 is connected to gate 16 and extends through a pneumatic actuator, indicated generally at 22. Pneumatic actuator 22 includes a cylinder 24 mounted on valve body 14. A piston 26 mounted in cylinder 24 is secured to stem 20 for reciprocating movement within the cylinder. A spring 28 mounted in the lower portion of cylinder 24 urges piston 26 and gate valve member 16 to a closed position or a raised position as the apparatus is shown in FIG. 1.

A high-low pilot valve assembly is generally indicated at 30 and includes a high pressure pilot valve or pressure sensor 32 and a low pressure pilot or pressure sensor 34. Pressure in flowline 10 is sensed through the pilot pressure sensing line 36 and passed through a branch manifold 38 to each of the pilot valves 32 and 34. Branch manifold 38 forms a structural support or mount for pilot valves 32 and 34. Each pilot valve 32 and 34 has a shiftable valve member therein and a spring urging the shiftable valve member in one direction in opposition to pressure from the source being monitored. A pneumatic fluid source 40 is connected through a pressure regulator 42 to high pressure pilot valve 32, then by a connecting line 44 to low pressure pilot 34. The pneumatic fluid source can be a pressurized source of air, oxygen, nitrogen gas, etc. In this disclosure for convenience, reference is made to the supply being compressed air. It is to be understood that the control valve-indicator as well as the actuator and pilot valves can be operated from a hydraulic fluid source if desired. High pressure pilot 32 is adjusted so that it is actuated at a predetermined high pressure of flowline 10, and likewise low pressure pilot 34 may be set to a predetermined low pressure actuation point. By arranging the pressure sensors in this manner an operating fluid pressure range can be selected for flowline 10. In the event the pressure in flowline 10 drops below or raises above the predetermined limits then the appropriate pilot valve is actuated. Upon actuation of either the high pressure pilot 32 or the low pressure pilot 34 the air in line 46 from the low pressure pilot to the control valve-visual indicator, indicated generally at 52, is interrupted and exhausted through a vent in the pilot valve and the control valve. For further details concerning the operation of pilot valves 32 and 34 reference is made to U.S. Pat. No. 3,043,331, the entire disclosure of which is incorporated by this reference.

Figure 2:
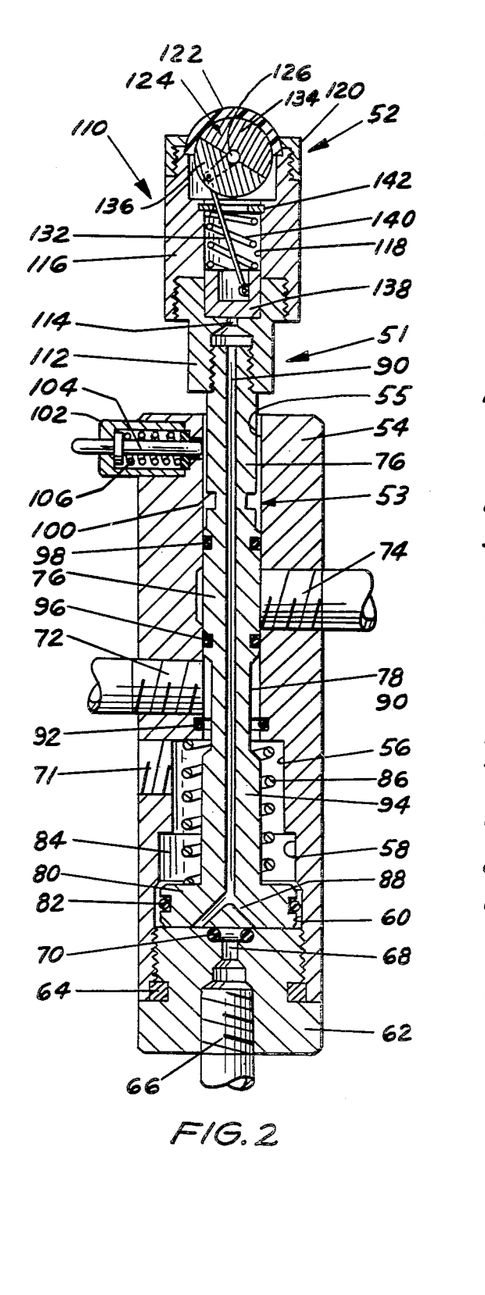
FIG. 2 is a cross-sectional view of one embodiment of the control valve-visual indicator of this invention with the slide valve thereof shown in the retracted or seated position.
Figure 3:
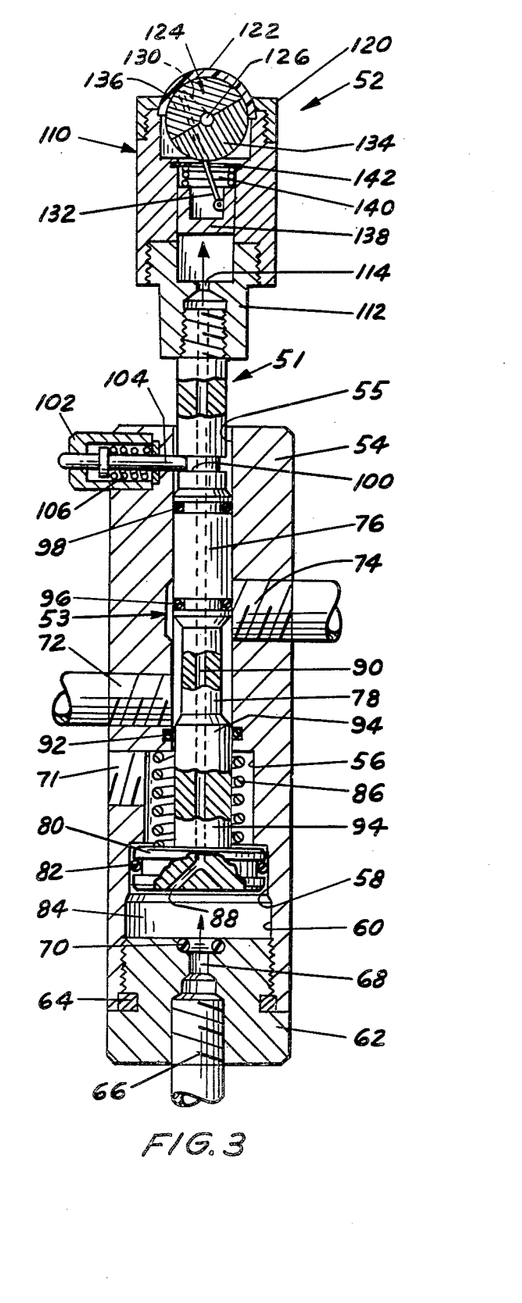
FIG. 3 is a cutaway view of the control valve-visual indicator shown in FIG. 2 having the slide valve thereof in the extended position.

Referring to FIGS. 2 and 3 wherein one embodiment of the control valve-visual indicator of this invention is shown in detail, with such being indicated generally at 52, and including a housing 54 forming the main portion of the valve with a slide valve 51 slidably mounted therein. Housing 54 has a central bore therethrough indicated generally at 53. Bore 53 is comprised of several bore portions including a small diameter portion 55 terminating at one end of the housing 54 and continuing to a midpoint in the housing where it joins an intermediate diameter bore portion 56 which continues to join a larger diameter bore portion 58, which connects with the largest diameter bore portion 60 in the end portion of the housing. Housing 54 is internally threaded in the end portion adjacent the largest bore portion 60 to receive and mount a housing end member 62. A seal ring 64 is located at the internal juncture of housing 54 and housing end 62. A pressure sensing port 66 is located through housing end 62 for connecting the pressure sensor to the monitored pressure line. A passageway 68 connects pressure sensing port 66 with the interior end of housing end 62. An annular seal ring 70 is mounted in a groove around passageway 68 on the end of housing end 62 which is enclosed inside housing 54. Housing 54 is provided with a vent port 71 at a midportion thereof in fluid communication with intermediate bore portion 56. An outlet port 72 is provided in housing 54 in a midportion thereof and connected with small bore portion 55 at a point located along small bore portion 55 and spaced from the juncture of small bore portion 55 and intermediate bore portion 56 as shown clearly in FIG. 2. An inlet port 74 is provided in housing 54 at a point between outlet port 72 and the housing end which has slide valve 51 extending therefrom.

Slide valve 51 has a small diameter portion 76 comprising a majority of the length thereof. A reduced diameter portion 78 at a midportion of slide valve small diameter portion 76 is positioned to be moved between one position in fluid communication with inlet port 74 and outlet port 72 and another position connecting outlet port 72 and vent port 71. A piston 80 is threadedly secured to one end of slide valve member 51 at the end of the small diameter portion 76. Piston 80 has an annular groove therearound receiving and mounting an O-ring 82 for sealing in bore portion 58. Piston 80 has its diameter sized to move into bore portion 58 with O-ring 82 in fluid tight sealing relation with the bore side wall. Bore portion 60 is sized diametrically substantially larger than piston 80 so that when piston 80 moves into bore portion 60 fluid can flow around the perimeter of the piston past O-ring 82 in the piston chamber 84 defined by bore portions 58 and 60. A helically wound spring 86 is provided around slide valve small diameter portion 76 with one end of the spring abutting on the inner side of piston 80 and the opposite end of the spring abutting the end of intermediate bore portion 56. Slide valve member 51 has an elongated longitudinal bore 90 therethrough connecting with at least one passageway 88 through piston 80 connecting elongated passageway 90 with the exposed end of piston 80. Passageway 88 opens on the outer end face of piston 80 at a point which is radially outward of annular seal 70 as shown clearly in FIGS. 2 and 3.

Housing 54 is provided with an internal seal for sealing on slide valve member 56 between outlet port 72 and intermediate bore portion 56. This internal seal is comprised of an annular groove in housing 54 along bore 53 for receiving and mounting an O-ring 92 at a point between outlet port 72 and vent port 71 to seal with the piston end portion 94 of slide valve member 51 when it is in the extended position as shown in FIG. 3. Slide valve member 51 is provided with a pair of annular grooves therearound in a spaced relation in a midportion thereof mounting O-rings 96 and 98. O-rings 96 and 98 are arranged in a spaced relation to each other and to reduced diameter portion 76 in a position such that when the slide valve is in the retracted or seated position as shown in FIG. 2, O-ring 96 will seal between slide valve 51 and bore 53 at a point between outlet port 72 and inlet port 74, and O-ring 98 will seal on the opposite side of inlet port 74. These O-rings function to block flow into the inlet port 74 when the control valve is in the retracted position.

A latch structure is provided on the control valve to temporarily secure slide valve 51 in the extended position for start up of a system containing the control valve-visual indicator. An annular groove 100 is provided in slide valve member 76 at a point outwardly of O-ring 98. A latch housing 102 is mounted with valve housing 54 and contains a detent member 104. Detent member 104 is urged in an outward direction relative to slide valve 51 by a helical spring 106 positioned around detent member 104 and enclosed in latch housing 102. In use, detent member 104 is manually pressed inwardly in opposition to spring 106 with the inner end of detent member 104 being held inwardly by spring 86 urging slide valve 5 downwardly. Functionally, the latch or detent member 104 holds slide valve 51 in the extended position until fluid pressure in piston chamber 84 is sufficient to displace slide valve 51 outward a small amount when the system is properly operating after the initial start up period.

The visual indicator portion of the control valve-visual indicator structure 52 is generally indicated at 110 and it is mounted on the outer end portion of slide valve 51. Visual indicator 110 includes a housing enclosing a bi-colored indicator member and other apparatus to move the bi-colored indicator member between alternate positions thereof. The indicator housing includes a mount or base portion 112 which has a bore therethrough and is internally threaded on one end to be threadedly mounted on the outer end portion of slide valve 51. A port 114 connects the end of the threaded bore portion in housing base portion 112 to a cylindrical bore on the opposite end thereof. An indicator housing intermediate portion 116 is threadedly mounted with the exterior of housing base portion 112 and it has a cylindrical bore 118 therethrough which forms the cylinder for a piston and cylinder apparatus used for displacement of the bi-colored indicator member. An indicator housing outer end portion 120 is threadedly mounted on the outer end portion of housing intermediate portion 116 and includes a transparent cover 122 bulging outwardly therefrom. The bi-color indicator member is a substantially spherically shaped member 124 having an axis or shaft 126 positioned therethrough and a slot 128 therein substantially perpendicularly oriented relative to shaft 126. A connecting arm 130 is secured to shaft 126. Connecting arm 130 provides an attachment point for pivotally mounting a connecting rod 132. The exterior surface of spherical indicator member 124 is colored in two contrasting hemispherical portions with such surfaces indicated at 134 and 136. In practice in industry it has been found desirable in some instances to color these surfaces with bright contrasting colors. For example, surface 134 can be colored red and surface 136 can be colored green. For illustration purposes, surfaces 134 and 136 are appropriately shaded to indicate red and green surfaces respectively. It is obvious that the choice of colors for the surfaces depends upon a specific application and the desire of the user. Shaft 126 is mounted in a bearing journal (not shown) in indicator housing intermediate member 116 so the shaft will rotate substantially perpendicular to the elongated longitudinal axis of slide valve member 51. The portion of the indicator mechanism to rotate visual indicator member 124 includes a piston 138 mounted in cylindrical bore 118 in housing members 112 and 116, and a spring 140. Spring 140 is held on one end by a spring retainer 142 mounted in indicator housing 116 and abuts piston 138 on its opposite end to urge piston 138 toward slide valve member 51. Connecting rod 132 is pivotally mounted with piston 138 and visual indicator member 124. Movement of piston 138 between alternate positions at the opposite ends of bore 118 displaces piston rod 132 generally longitudinally relative to indicator housing 110 and thereby rotatably displaces indicator member 124 about the axis of shaft 126. Slot 128 in spherical member 124 serves as a recess to accommodate a portion of connecting rod 132 when piston 138 is moved toward the indicator member as shown in FIG. 3. When the pressure applied at port 114 is not high enough to overcome the force of spring 140 then indicator 124 assumes the position shown in FIG. 2. When fluid pressure applied to port 114 is sufficient to overcome spring 140, then piston 138 moves outwardly away from slide valve member 51 thereby displacing connecting arm 130 and rotating spherical indicator member 124.

Figure 7:
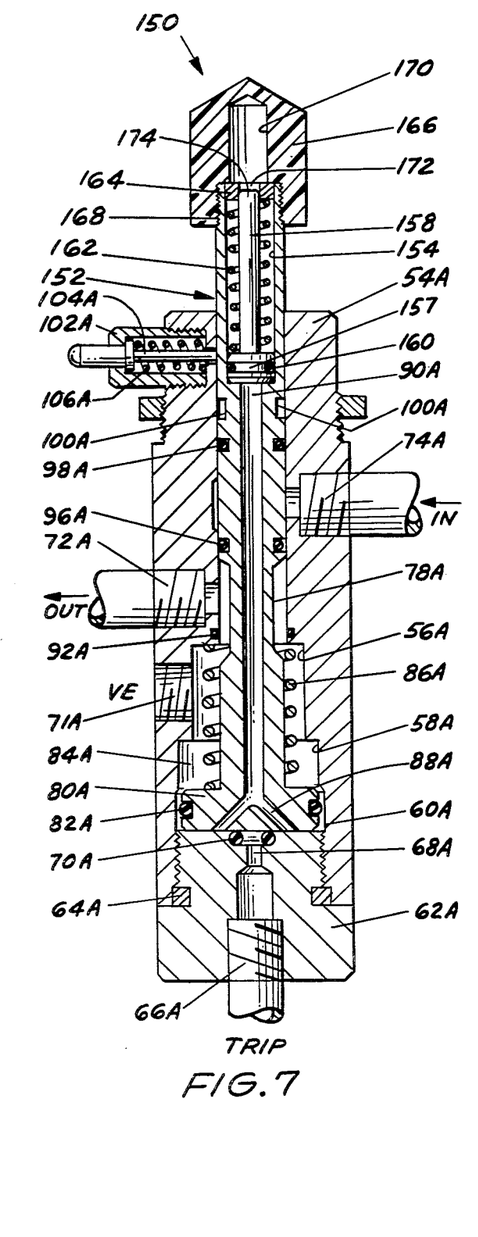
FIG. 7 is cross-sectional view of another embodiment of the control valve-visual indicator of this invention employing a movable piston in the slide valve member as the indicator element with the control valve shown in a retracted or seated position.
Figure 8:
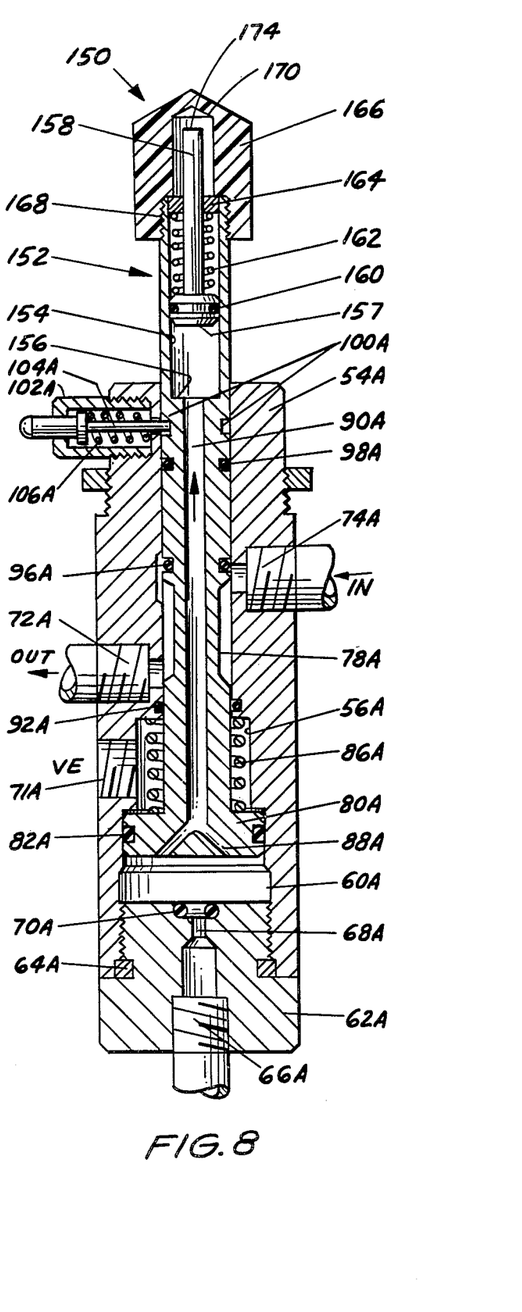
FIG. 8 is a cross-sectional view of the control valve-visual indicator shown in FIG. 7 with the valve and indicator in an extended position or normal operating position.

FIGS. 7 and 8 show an additional, or second, embodiment of the control valve-visual indicator of this invention in the retracted position and the extended position. This second embodiment of the control valve-visual indicator is indicated generally at 150. The majority of the control valve portion of this structure is identical to that described previously and for brevity will not be repeated here. Portions of this structure which are identical to that described above are given the same referenced numerals as the structure described above followed by the letter "A." The main difference in the control valves is in the outer end portion of the slide valve member 152 where the indicator structure is located. In this embodiment of the device provisions are made for a piston and cylinder in slide valve member 152 to move the indicator member. The outer end portion of the slide valve member 152 is the only portion structurally different from the control valve shown in FIGS. 2 and 3. Slide valve member 152 has a longitudinal internal bore 154 in its outer end portion terminating at an internal abutment 156 around the slide valve internal passageway 90A. A piston 157 is slidably mounted in internal bore 154 and has an elongated indicator member or stem 158 secured thereto extending from one side thereof. Piston 157 has a peripheral groove therein receiving and mounting an O-ring 160 for sealing in bore 154. A helical spring 162 is positioned around stem 158 with one end abutting the stem side of piston 157 and the opposite end abutting an annular spring retainer member 164 rigidly secured in the outer open end of bore 154. Indicator member 158 is sufficiently long to terminate within the aperture 172 of spring retainer member 164 when piston 157 is seating on abutment 156. Spring retainer member 164 is held in place in bore 154 by an internal abutment in a transparent cover or enclosure 166 secured by threads 168 on the outer end portion of slide valve member 152. Transparent cover or enclosure 166 is provided with an internal bore 170. Bore 170 defines a reflective zone of the visual indicator device. When indicator member 158 is moved to the extended position the shank portion thereof moves through aperture 172 into the reflective zone defined by the bore 170 of cover 166.

In regard to the coloring of the indicator member 158, it is preferably colored some bright color which will be easily visible through the transparent cover 166. For example, indicator member 158 can be brightly colored on its cylindrical side wall with a contrasting color on its outer end 174. Alternately, if desired, indicator member end 174 can be given a gray appearing color so that when the color is viewed with indicator member 158 retracted the indicator has a rather neutral appearance. With this coloring scheme, a brightly colored side wall, for example green, on indicator member 158 would make the indicator have an easily distinguishable colored hue when the indicator member is extended. Another coloring scheme is to color the entire indicator member 158 including end 174 a single bright color so the overall colored appearance of the indicator will be significantly changed when the indicator member is extended or retracted although it remains basically the same color. In industrial practice it is typical to choose colors for indicating devices so they appear green for a normal condition and red for an abnormal condition. With this in mind, it would be acceptable to color indicator member 158 green on its side wall and red on its end 174. Considering the other described coloring schemes, the indicator member could be colored all green or green on the side and gray or silver or some neutral color on its end.

In the operation of control valve-visual indicator 150 is to be noted that the valve portion thereof will function the same as the valve portion of control valve-visual indicator 52 described above. The indicator device shown in FIGS. 7 and 8 provides a maximum color exposure when the control valve is in its normal operating condition as shown in FIG. 8, and it provides a minimal exposure when the control valve is in its out of service or retracted position as shown in FIG. 7. The indicator device 110 shown in FIGS. 2 and 3 provides a comparable degree of color exposure when it is in its normal operating position or out of service position.

Referring to FIGS. 1–3, and concerning operation of the control valve-visual indicator of this invention, it can best be understood from a combined description of these figures. Control valve-visual indicator 52 is shown in FIG. 1 with other elements of the complete system. The system as illustrated is in its normal operating condition with gate valve 12 open and fluid pressure applied to actuator 22 through control valve 52. The control circuit lines or connecting conduits are shown in dashed lines in FIG. 1.

Low pressure air is present in the lower portion of the control circuit for low pressure regulator 42 through pressure sensors 32 and 34 and in line 46 to the pressure sensing port 66 of control valve 52. A higher pressure air is present in the upper portion of the control circuit where it is regulated by high pressure regulator 41, connected with the inlet port 74 of control valve 52 and connected from outlet port 72 through line 45 to actuator 22. This high pressure air is communicated through control valve 52 into the actuator piston chamber above piston 26 to urge it downward in opposition to spring 28 to keep gate valve 12 open. So long as control valve 52 is in its normal operating position as shown in FIG. 3, a high pressure air is communicated through it to actuator 22. When the pressure in production line 10 raises above or drops below a predetermined pressure either the high pressure sensor 32 or the low pressure sensor 34 is tripped. When this occurs, the appropriately tripped pressure sensor vents the air from line 46 to the atmosphere and blocks the incoming low pressure air from pressure regulator 42. Once the pressure in line 46 drops, the pressure in control valve piston chamber 84 drops and spring 86 urges piston 80 to the seated position shown in FIG. 2. With the control valve in the position shown in FIG. 2, incoming high pressure air is blocked at inlet port 74 and outlet 72 is connected with vent 71 so that air form the actuator piston chamber is bled to the atmosphere and valve 12 is closed. In regard to the visual indicator, it is originally in the position shown in FIG. 3 with the green colored surface 136 visible through cover 122 and piston 138 in the raised position. Once the pressure reduces and slide valve 51 moves to the position shown in FIG. 2, the pressure in bore 90 is reduced and piston 138 moves to the end of bore 118 under the force from spring 140, and more importantly, the red colored surface 134 of indicator member 124 is now visible through cover 122. As described above, the red color will indicate to an operator that an abnormal condition exists in the system, in this instance it indicates gate valve 12 is closed.

For an operator to restart the system shown in FIG. 1, the housing of visual indicator 110 is grasped by hand and pulled outwardly thereby displacing slide valve member 51 to the position shown in FIG. 3. At this time, detent member 104 is pressed inward so that its inner end engages slide valve groove 100. Once this is done, the operator releases the visual indicator and the force of spring 86 on slide valve member 51 wedges detent member 104 in notch 100 to hold the slide valve member in the extended position. At this time, the visual indicator 110 exposes the red colored surface 134 because pressure in the system is not sufficiently high to displace piston 138. As pressure rises in the air chamber of actuator 22 gate valve 12 opens thereby raising the fluid pressure in product line 10. Pressure in control valve piston chamber 84 also raises and will reach a point sufficient to displace piston 80 slightly upwardly from the position shown in FIG. 3 so that detent member 104 is released and visual indicator piston 138 is moved to the position shown in FIG. 3. At this time the system containing control valve-visual indicator 52 is again in its normal operating condition.

Referring to FIG. 9, such illustrates another, third, embodiment of the control valve-visual indicator of this invention. This third embodiment has the same control valve structure (with the exception of the outermost end portion of the slide valve member) as the control valve shown in FIGS. 2 and 3. For brevity, description of the control valve structure will not be repeated here and portions of the control valve structure which are identical are given the same numerals as in FIGS. 2 and 3 followed by the letter "B." The distinction between the embodiment shown in FIGS. 2 and 3 and the embodiment shown in FIG. 9 lies in the visual indicator structure, indicated generally at 180, and its connection with the slide valve member.

In FIG. 9, the slide valve member, generally indicated at 182, has a longitudinal bore 184 in its outer end portion connecting with slide valve internal passageway 90B at a point well within its end portion. Visual indicator 180 includes a hollow housing 186 having a sleeve portion 188 threadedly mounted on the outer end portion of slide valve member 182. A piston 190 with a peripherally mounted O-ring 192 is slidably mounted in a cylindrical bore 193 in the inner portion of sleeve 188. A tension spring 194 is located in slide valve bore 184 and secured on one end to spring mount pin 186 mounted transversely through slide valve member 182 and attached on its opposite end to a spring mount lug 198 on piston 190. The indicator member is a spherically shaped member 200, like that shown in FIGS. 5 and 6 with opposite substantially hemispherical portions thereof colored red and green as shown, pivotally mounted on a shaft 202 journalled in indicator housing 186. A connecting rod 204 is pivotally mounted on one end to a lug 206 on piston 190 and on its opposite end to a connecting arm 208 which is enclosed in indicator member 200 and rigidly connected to shaft 202. A transparent cover member 210 is mounted over the end of indicator housing 186 to allow visual observation of one side of spherical indicator member 200.

Operationally visual indicator 180 performs similarly to the indicator device first described above. When fluid pressure in slide valve internal passageway 90B is less than that required to overcome the force of spring 194 on piston 190 then piston 190 and indicator member 200 are in the position shown in FIG. 9. Once fluid pressure in passageway 90B increases sufficiently to overcome spring 194 then piston 190 moves to the right from the position shown in FIG. 9 to rotate spherical indicator member 200 so that it exposes the green color. In this position the control valve is in its normal operating position. When the control valve-visual indicator is in the normal operating condition then pressure to its pressure sensing port is reduced then spring 194 moves piston 190 to the position shown in FIG. 9 as the pressure in passageway 90B and within bore 184 are also decreased. With visual indicator 180 as with the others described herein it is to be understood that they can be colored red and green as illustrated or colored otherwise at the desire of the user.

While the several embodiments shown in the drawings show the indicator element as employing different colors, it is to be understood that the indicator element which is movable between two positions, one indicating a normal operating condition and the other illustrating an abnormal condition, could be observed without the benefit of contrasting colors and our invention is not intended to be limited to the employment of contrasting colors.

In the use and operation of the control valve-visual indicator of this invention, it is seen that same provides a control valve which is adequate for controlling a fluid system which is regulated in accordance with pressure. The visual indicator provides a positive indication of the pressure condition in the control valve and likewise in the system where the control valve is connected. By combining the specific control valve structure with the visual indicator in the two embodiments disclosed and described in detail herein a very useful and relatively inexpensive device has been provided for both controlling and visually indicating the pressure conditions in a fluid actuated system. The control valve-visual indicator of this invention is simple to use, made with a minimum number of components, and provides for safety in a control system by providing a clear and positive indication of the pressure conditions in the system and furthermore the control valve-visual indicator of this invention is economical in that it saves the operator time in making other tests and expending valuable time and effort to determine a present condition of a particular system.

What is claimed is:

1. In a control valve structure having a hollow housing, an elongate slide valve mounted in said housing for longitudinal movement therein, means urging the slide valve to a seated position thereof, manually accessible means on the slide valve located outwardly of the housing and adapted to be manually manipulated to displace the slide valve from its seated position, and port means in said housing for applying a sensed fluid pressure to said slide valve in a manner to maintain the slide valve displaced from its seated position when the sensed fluid pressure is sufficiently high to overcome said urging means, the improvement comprising:

visual indicator means mounted on said manually accessible means for movement between a first position to indicate a first operating condition and a second position to indicate a second operating condition;

means for biasing said visual indicator means to one of said first and second positions;

a passageway in said slide valve located and arranged to receive and apply pressurized fluid to said indicator means under all conditions of operation when said slide valve is displaced from its seated position and said port means is exposed to fluid under pressure; and pressure responsive means for maintaining said indicator means in the other of said first and second positions thereof whenever a predetermined high fluid pressure is applied at any time to said passageway, said indicator means moving to said one position thereof under the influence of said biasing means whenever the pressure applied to said passageway is below said predetermined high fluid pressure.

2. A combination control valve and visual indicator device for controlling fluid flow between a fluid pressure source and an actuator, said device comprising:

a hollow housing having an elongate slide valve mounted for longitudinal movement therein, means urging said slide valve to a blocking position thereof wherein flow between said source and actuator is blocked;

handle means on said slide valve located outwardly of said housing and adapted to be manually manipulated to move said slide valve to an unblocking position wherein flow between said source and actuator is permitted, releasable means for temporarily holding said slide valve in the unblocking position after being moved thereto by said handle means;

a pilot port in said housing responsive to a sensed fluid pressure, said pilot port applying the sensed pressure to said slide valve in a manner to maintain the slide valve in the unblocking position when the sensed pressure is sufficiently high to overcome said urging means, said releasable means releasing the slide valve when said urging means is overcome by the sensed fluid pressure;

visual indicator means mounted on said handle means for movement between a first position to indicate a first operating condition of the actuator and a second position to indicate a second operating condition of the actuator, means for biasing said indicator means to one of said first and second positions thereof;

a passageway in said slide valve in fluid communication with said pilot port whenever said slide valve is in the unblocking position; and pressure responsive means for moving said indicator means to the other of said first and second positions thereof under all conditions of operation when said pilot port applies fluid to said passageway in excess of a predetermined pressure level, said indicator means moving to said one position thereof under the influence of said biasing means when the fluid pressure in said passageway is below said predetermined pressure level.

3. In a control valve and visual indicator device for controlling fluid flow between a fluid pressure source and an actuator, the combination of:

a hollow housing having an elongate slide valve mounted for longitudinal movement therein, said slide valve having one end extending outwardly of said housing;

handle means on said one end of the slide valve adapted to be manually manipulated to effect movement of said slide valve in a longitudinal direction;

means urging said slide valve to a seated position thereof;

port means in said housing responsive to a sensed fluid pressure and operable to apply the sensed pressure to said slide valve in a manner to maintain the slide valve displaced from its seated position when the sensed pressure is sufficiently high to overcome said urging means;

visual indicator means mounted on said handle means for movement between one position to indicate a normal operating condition and a second position to indicate an abnormal operating condition, means to bias said indicator means to said second position thereof;

a passageway in said slide valve providing a closed fluid path extending between said port means and said indicator means under all conditions of operation when said slide valve is displaced from its seated position; and means responsive to the fluid pressure in said passageway for maintaining said indicator means in said one position thereof upon application of a predetermined high fluid pressure at any time through said port means and passageway, said means to bias effecting movement of said indicator means to said second position thereof when the pressure in said port means and passageway is below said predetermined high fluid pressure.

4. The combination set forth in claim 3, wherein said passageway has a first end for receiving fluid from said port means and a second end communicating withh said fluid pressure responsive means to apply fluid thereto, said passageway providing a closed path between said first and second ends under all conditions of operation.

5. A valve structure for controlling fluid flow between a fluid pressure source and a valve actuator in response to pressure changes in a pilot line, said valve structure comprising:

a housing having an inlet port communicating with the pressure source, an outlet port communicating with the valve actuator, and a bleed port for discharging fluid from the housing;

an elongate slide valve mounted in said housing for movement between (a) a seated position wherein fluid flow is blocked between the inlet and outlet ports but is permitted between the outlet and bleed ports to bleed fluid from the valve actuator and (b) on unseated position wherein fluid flow is blocked between the outlet and bleed ports but is permitted between the inlet and outlet ports to apply fluid to the valve actuator;

means urging said slide valve to the seated position;

manually accessible means on said slide valve located outwardly of the housing and adapted to be manually manipulated to move the slide valve longitudinally to its unseated position against the force of said urging means;

pilot port means in said housing communicating with the pilot line and with the slide valve for applying the pilot line pressure to the slide valve in a manner to maintain same in its unseated position when the pilot line pressure is sufficiently high to overcome the force of said urging means;

visual indicator means mounted on said manually accessible means for movement between one position to indicate a normal operating condition of the valve actuator and a second position to indicate an abnormal operating condition of the valve actuator;

means for biasing said indicator means to its second position;

a passageway in said slide valve providing a closed fluid path from said pilot port means to said indicator means under all conditions of operation when said slide valve is in its unseated position, whereby said indicator means is exposed to the pilot line pressure through said pilot port means and passageway whenever said slide valve is in its unseated position; and means for maintaining said indicator means in said one position when the pressure applied thereto through said passageway exceeds a predetermined level sufficient to overcome the force of said biasing means, said indicator means moving to said second position under the influence of said biasing means when the pressure in said passageway is below said predetermined level.

6. The valve structure set forth in claim 5, wherein said passageway extends longitudinally in said slide valve substantially the entire length thereof, said passageway having a first end communicating with said pilot port means and a second end communicating with said indicator means with a closed fluid path being presented between said first and second ends under all conditions of operation.

7. A combination control valve and visual indicator device for controlling fluid flow between a fluid pressure source and an actuator and for visually indicating the operating condition of the actuator, said device comprising:

a hollow housing having an elongate slide valve mounted therein for longitudinal movement between a seated position wherein fluid flow is blocked between the source and actuator and an unseated position wherein fluid flow is permitted between the source and actuator;

means urging said slide valve to its seated position;

manually accessible means on the slide valve located outwardly of the housing and adapted to be manually manipulated to move the slide valve from the seated to the unseated position;

port means in said housing for receiving and applying sensed fluid pressure to said slide valve in a manner to maintain the slide valve in its unseated position when the sensed pressure is sufficiently high to overcome the force of said urging means;

a fluid passageway in said slide valve located and arranged to receive pressurized fluid when said slide valve is in its unseated position and said port means is exposed to fluid under pressure;

a piston closely received in said passageway for reciprocal movement therein between first and second positions in response to pressure changes in the passageway;

a visually observable indicator member mounted on said manually accessible means for rotational movement between a first position to indicate a normal operating condition of the actuator and a second position to indicate an abnormal operating condition of the actuator;

means coupling said piston with said indicator member in a manner to effect movement of said indicator member to its first position upon movement of said piston to its first position, and to effect movement of said indicator member to its second position upon movement of said piston to its second position; and means for biasing said piston to its second position, said piston moving to its first position when the fluid pressure applied to said piston in said passageway is above a predetermined level sufficiently high to overcome the force of said biasing means, and to its second position under the influence of said biasing means when the fluid pressure in said passageway is below said predetermined level, whereby a normal operating condition of the actuator is indicated by said indicator member when the slide valve is in its unseated position and the fluid pressure applied to said passageway is above said predetermined level, and an abnormal operating condition of the actuator is indicated by said indicator member when the fluid pressure applied to said passageway is below said predetermined level.

8. The device set forth in claim 7, including a seal element carried on said piston and providing a seal in said passageway between said piston and slide valve, whereby said indicator member is isolated from the fluid pressure in said passageway.

9. The device set forth in claim 7, wherein said indicator member has a first segment which is visually observable in the first position of the indicator member and a second segment which is visually observable in the second position of the indicator member, said first and second segments being of contrasting colors.

* * * * *

UNITED STATES PATENT AND TRADEMARK OFFICE
CERTIFICATE OF CORRECTION

PATENT NO. : 4,194,529
DATED : March 25, 1980
INVENTOR(S) : Melvin J. Hargraves/Clifford M. Peters It is certified that error appears in the above-identified patent and that said Letters Patent are hereby corrected as shown below:

On Cover Page, Notice Section, line 2 thereof, change "1995" to -- 1996 --.

Signed and Sealed this

Sixteenth Day of December 1980

[SEAL]

Attest:

SIDNEY A. DIAMOND

Attesting Officer

Commissioner of Patents and Trademarks